United States Patent
Barber et al.

(10) Patent No.: US 9,483,311 B2
(45) Date of Patent: Nov. 1, 2016

(54) LOGICAL DATA SHUFFLING

(71) Applicant: International Business Machines Corporation, Armonk, NY (US)

(72) Inventors: Ronald J. Barber, San Jose, CA (US); Robert S. Germain, Larchmont, NY (US); Guy M. Lohman, San Jose, CA (US); Rene Mueller, San Jose, CA (US); Ippokratis Pandis, Palo Alto, CA (US); Vijayshankar Raman, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 14/486,628

(22) Filed: Sep. 15, 2014

(65) Prior Publication Data

US 2016/0077878 A1    Mar. 17, 2016

(51) Int. Cl.
  *G06F 11/00*  (2006.01)
  *G06F 9/50*  (2006.01)
  *G06F 11/20*  (2006.01)

(52) U.S. Cl.
  CPC ......... *G06F 9/505* (2013.01); *G06F 11/2033* (2013.01); *G06F 2201/805* (2013.01); *G06F 2201/85* (2013.01)

(58) Field of Classification Search
  USPC .................................................. 714/2, 25
  See application file for complete search history.

(56) References Cited

U.S. PATENT DOCUMENTS

| | | | |
|---|---|---|---|
| 4,931,959 A | 6/1990 | Brenner et al. | |
| 7,042,837 B1* | 5/2006 | Cassiday | H04L 45/00 370/225 |
| 2004/0215640 A1 | 10/2004 | Bamford | G06F 17/30575 |
| 2008/0229152 A1* | 9/2008 | Moroda | G06F 11/321 714/38.14 |
| 2009/0006888 A1* | 1/2009 | Bernhard | G06F 11/08 714/6.12 |
| 2009/0037773 A1* | 2/2009 | Archer | H04L 12/2697 714/37 |
| 2010/0318774 A1* | 12/2010 | Abts | G06F 11/0721 712/234 |
| 2012/0131126 A1* | 5/2012 | Bandyopadhyay | H04L 67/1097 709/213 |
| 2012/0246512 A1* | 9/2012 | Iwashita | G06F 9/5066 714/11 |
| 2013/0227227 A1 | 8/2013 | Jung et al. | |
| 2013/0275707 A1 | 10/2013 | Schenfeld et al. | |

* cited by examiner

*Primary Examiner* — Sarai Butler
(74) *Attorney, Agent, or Firm* — Lieberman & Brandsdorfer, LLC

(57) ABSTRACT

Embodiments relate to data shuffling by logically rotating processing nodes. The nodes are logically arranged in a two or three dimensional matrix. Every time two of the nodes in adjacent rows of the matrix are positionally aligned, these adjacent nodes exchange data. The positional alignment is a logical alignment of the nodes. The nodes are logically arranged and rotated, and data is exchanged in response to the logical rotation.

20 Claims, 11 Drawing Sheets

LOGICAL DATA SHUFFLING

BACKGROUND

This invention relates to logical data shuffling among a plurality of processing nodes. More specifically, the invention pertains to logically arranging and rotating the nodes, and exchanging data in response to the logical rotation.

Communication is the limiter in most parallel computing systems. Specifically, in parallel processes, a phase exists where data needs to be communicated among processing nodes. This communication of data relies on capacity of switches. Data shuffling is a process of moving data among processing nodes so that the data will be in a specific location for processing. For example, data shuffling is common in database applications to support database operations such as joins, group-by, building indexes, clustering data prior to load, etc., and in map-reduce to send data from mapper nodes to reducer nodes. However, physically moving processing nodes presents challenges, both electrically and mechanically, and of course creates inefficiency.

SUMMARY OF THE INVENTION

This invention comprises a method, computer program product, and system for data shuffling based on a logical arrangement of processing nodes.

A method, computer program product, and system are provided for logically arranging a plurality of computing nodes in a coordinated communication topology and shuffling data, also referred to herein as re-distributing data, within the arrangement. A plurality of processing nodes are arranged in a cluster, with the arrangement including a coordinated communication topology, and a static data distribution of data within the topology. A step sequence is pre-arranged. A step in the sequence encompasses an alignment of nodes into node pairs within the topology, with the node pair having at least one partner node. Data is exchanged among the aligned node pairs in the sequence. The data exchange supports bi-directional exchange between node pairs. At the completion of the step sequence, data is re-distributed among the nodes in the topology.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

FIG. 8 depicts a block diagram illustrating placement of data in nodes following completion of the row transfer phase.

FIG. 9 depicts a block diagram illustrating placement of data in nodes following completion of the column transfer phase.

DETAILED DESCRIPTION

Figure 1:
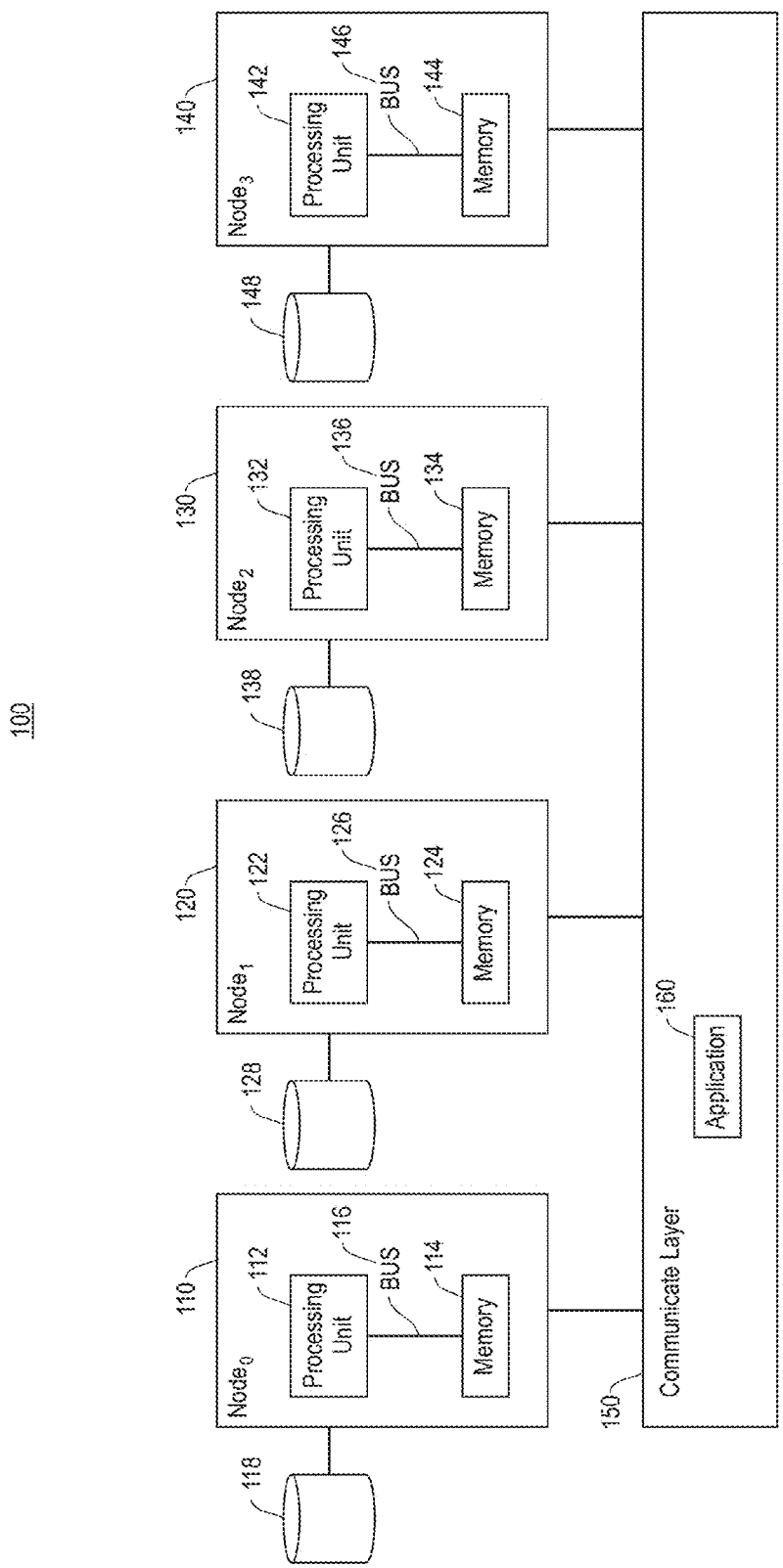
FIG. 1 depicts a block diagram illustrating a system for supporting logical data shuffling among processing nodes.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Data shuffling relates to a computer system with multiple processing nodes, and specifically that aspect of each node in the system sending data to every other node in the system. In one embodiment, data shuffling is employed in databases and map-reduce. An explicitly orchestrated pattern for the data exchange is provided so that computing nodes do not arbitrarily send data to other computing nodes. The shuffling is performed based on logically arranging the nodes and logically rotating the nodes in the arrangement. The logical node movement is performed by circuit switching. Accordingly, this logical arrangement eliminates the need to physically arrange and/or move the processing nodes to facilitate and enable the data exchange.

The processing nodes are logically arranged in a matrix. In a basic form, the processing nodes are arranged in a two dimensional matrix comprised of at least two rows and at least two columns. In one embodiment, the nodes in the two dimensional matrix are separated into two classes, and the logical arrangement includes aligning one node from a first class with one node from a second class. For example, in one embodiment, one of the classes of nodes may be storage nodes and another class of the nodes may be application nodes. The nodes are logically moved in a select direction in a half rotation, and data is exchanged. In one embodiment, data is moved between the node(s) from the first class with the node(s) from the second class in response to the alignment. In one embodiment, the nodes may be moved in a clockwise or a counterclockwise direction. The logical movement is performed by circuit switching. The nodes along each pair of adjacent rows are attached to a switch. Initially, the switch connects each node to its neighbor on an adjacent row. During a logical movement, the connections are changed so that each node connects to its neighbor on the adjacent row.

The arrangement of nodes is a logical arrangement and not a physical arrangement. The complexity of the arrangement of nodes grows with the dimensions of the arrangement. For example, in a three dimensional arrangement, the nodes are arranged in columns, rows, and levels. In one embodiment, the three dimensional arrangement is based on separation of the nodes into three classes, and the logical alignment includes aligning one node from the first class with one node from the second class and one node from the third class. Following completion of the rotation and associated data shuffling between rows and columns, the process changes levels, so that the data shuffling may continue among the rows and columns of nodes on each level in the arrangement.

FIG. 1 is a block diagram (100) illustrating a system for supporting logical data shuffling among processing nodes. As shown, a plurality of processing nodes is shown operatively coupled to a communication layer (150) for high bandwidth communication. In the example shown herein, four processing nodes are shown, herein after referred to as a node. The nodes include $node_0$ (110), $node_1$ (120), $node_2$ (130), and $node_3$ (140). Each of the nodes includes a processing unit, memory, and local data storage. As shown, $node_0$ (110) is provided with processing unit (112) operatively coupled to memory (114) across a bus (116), and is in communication with local data storage (118); $node_1$ (120) is provided with processing unit (122) operatively coupled to memory (124) across a bus (126), and is in communication with local data storage (128); $node_2$ (130) is provided with processing unit (132) operatively coupled to memory (134) across a bus (136), and is in communication with local data storage (138); and $node_3$ (140) is provided with processing unit (142) operatively coupled to memory (144) across a bus (146), and is in communication with local data storage (148). In one embodiment, an application (160) is embedded in the communication layer (150) to administer the data shuffling. Accordingly, the arrangement of the processing nodes together with the communication layer enables logical movement of the nodes to support data shuffling.

Figure 2:
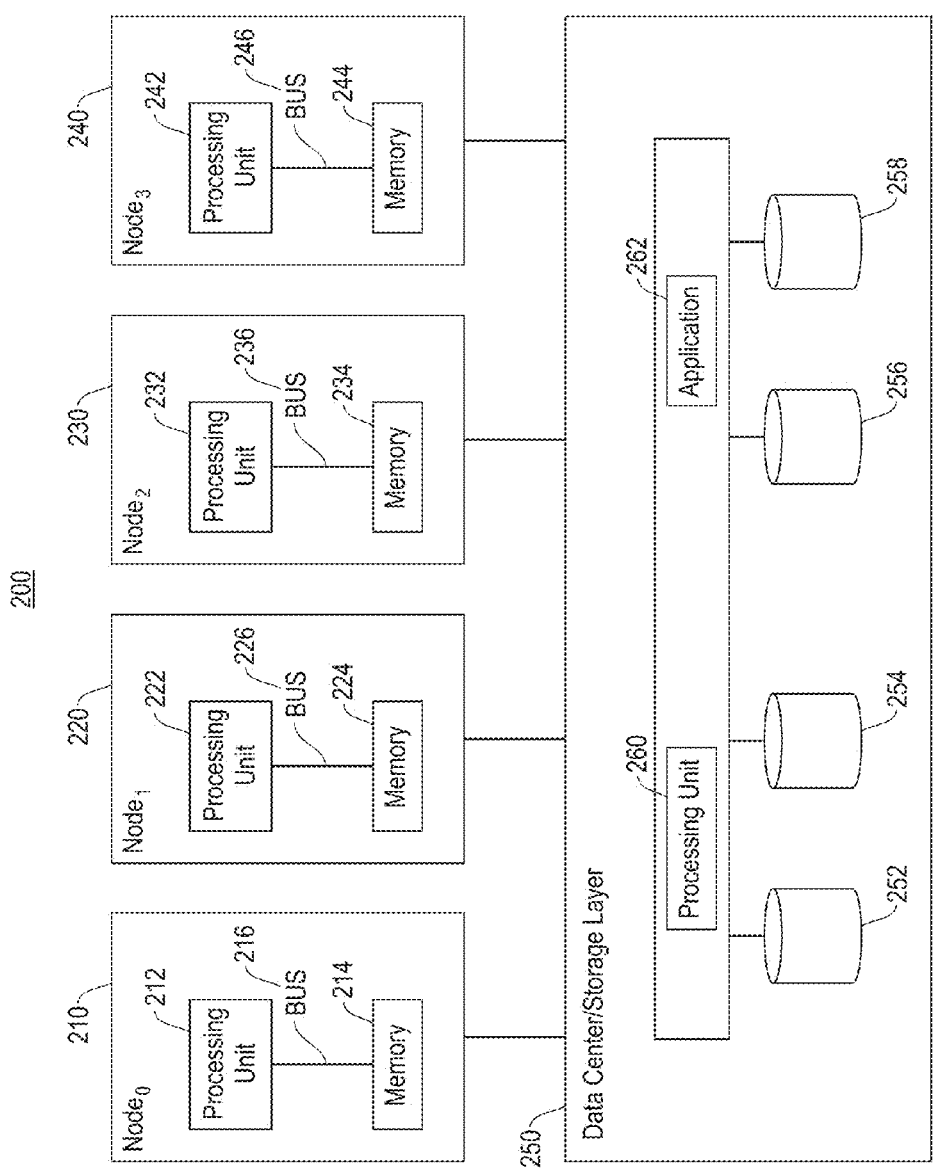
FIG. 2 depicts a block diagram illustrating another system for supporting logical data shuffling among processing nodes.

Referring to FIG. 2, a block diagram (200) is provided illustrating another system for supporting logical data shuffling among processing nodes. Similar to the arrangement shown in FIG. 1, a plurality of processing nodes is shown operatively coupled to a storage layer (250) that supports high bandwidth communication. In the example shown herein, four processing nodes are shown, each hereinafter referred to as a node. The nodes include $node_0$ (210), $node_1$ (220), $node_2$ (230), and $node_3$ (240). Each of the nodes includes a processing unit, memory, and local data storage. As shown, $node_0$ (210) is provided with processing unit (212) operatively coupled to memory (214) across a bus (216); $node_1$ (220) is provided with processing unit (222) operatively coupled to memory (224) across a bus (226); $node_2$ (230) is provided with processing unit (232) operatively coupled to memory (234) across a bus (236); and $node_3$ (240) is provided with processing unit (242) operatively coupled to memory (244) across a bus (246). Persistent data storage for the processing nodes (210)-(240) is provided in the storage layer. In the example shown herein, the storage layer (250) includes a plurality of storage devices (252), (254), (256), and (258) that are operatively coupled to processing unit (260) and an application (262) to facilitate data shuffling. In one embodiment, each of the nodes is operatively coupled to select storage devices in the storage layer (250). The application (262) manages the data shuffling among the nodes. In one embodiment, the data shuffling reorganizes data within the data layer (250).

Both the structures of FIGS. 1 and 2 support logical data shuffling in a multi-node configuration. Specifically, the logical data shuffling enables the nodes to remain physically stationary during the data exchange. In one embodiment, an application is embedded in the communication layer (150) or the storage layer (250) to administer the data shuffling. The nodes are arranged with a layout, also referred to herein as a topology, that supports communications between logically or physically aligned nodes during a step sequence, and also referred to as coordinated communication topology. Accordingly, the arrangement of the processing nodes together with the communication layer enables logical movement of the nodes to support data shuffling.

Figure 3:
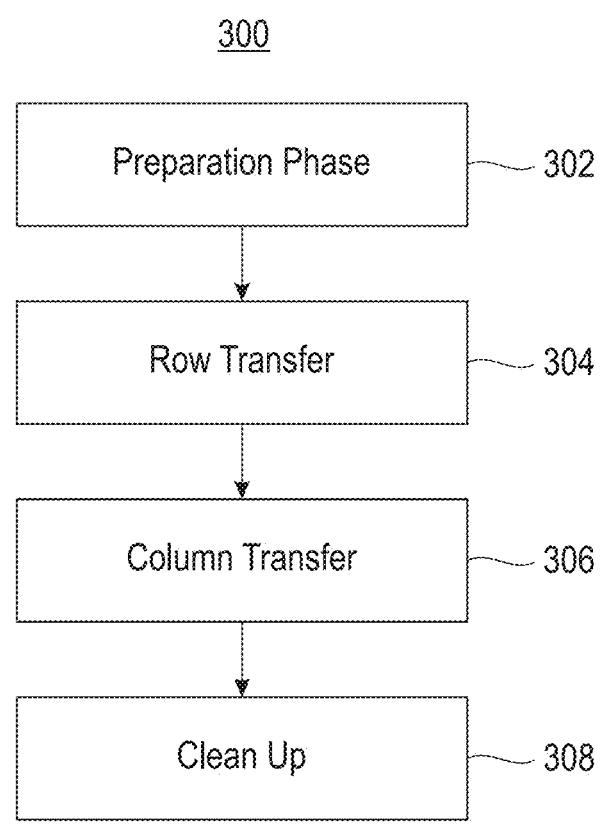
FIG. 3 depicts a flow chart illustrating an overview of the process for data shuffling.

FIG. 3 is a flow chart (300) illustrating an overview of the process for data shuffling. As shown, the initial step is referred to herein as the preparation phase (302). Details of the preparation phase are shown and described in FIG. 4. The preparation phase entails arrangement of the nodes and defining parameters of the shuffling of data to take place. In one embodiment, the data shuffling takes place in four phases for a two dimensional arrangement of the nodes. Prior to the data shuffling it is understood that the cluster of nodes has a total quantity of processing nodes that is divisible by four, and data distributed across the nodes is static and requires re-distribution. Following the preparation phase, row transfer is commenced and processed (304). Details of the row transfer are shown and described in FIG. 5. The row transfer entails transferring data between row pairs. Following the row transfer, the column transfer is commenced and processed (306). Details of the column transfer are shown and described in FIG. 6. The column transfer is the final phase of the data shuffling process. After this phase, data is at the intended destination node with the exception of data that fails to transfer within the allotted time. Following the column transfer, the clean-up process is commenced and processed (308). Details of the clean-up process are shown and described in FIG. 7. The clean-up process pertains to transferring data that failed to transfer during the row or column transfers due to time expiration.

Figure 4:
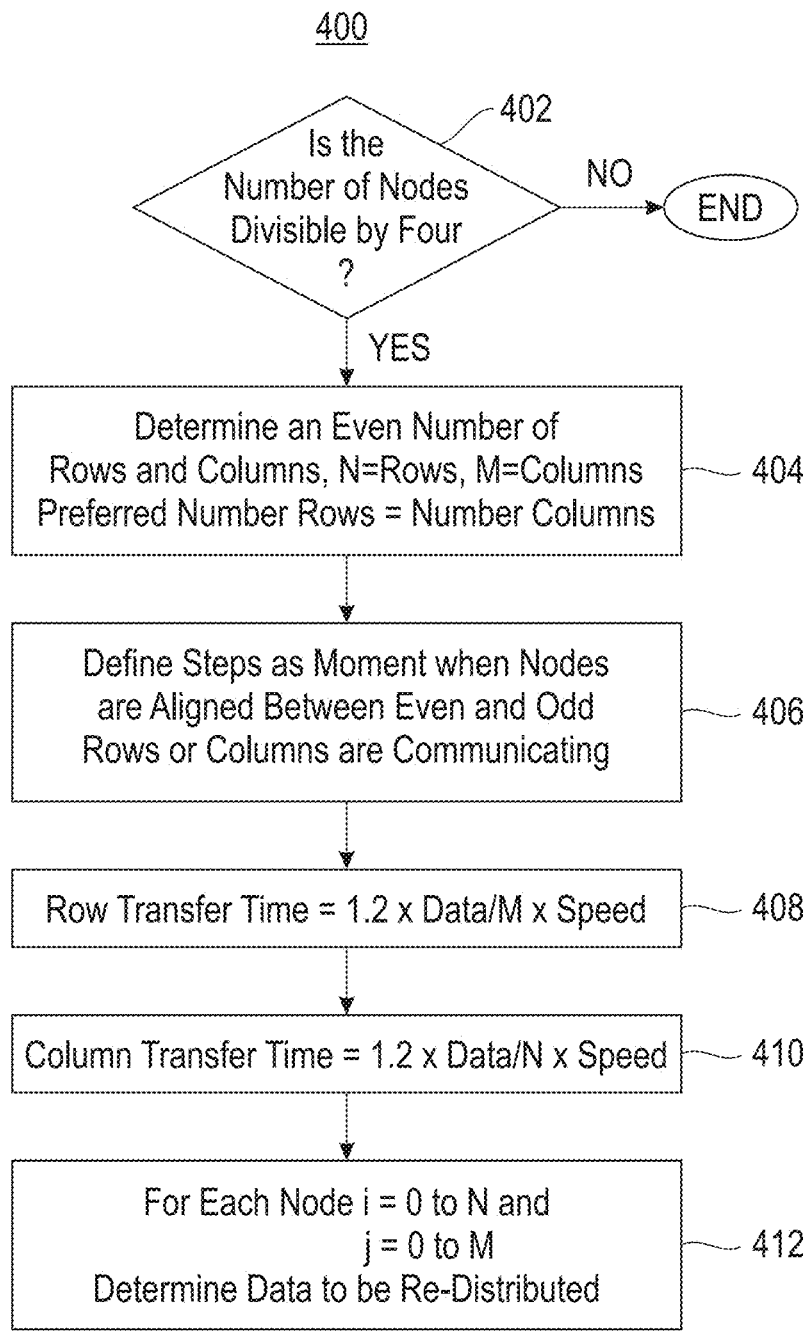
FIG. 4 depicts a flow chart illustrating a preparation process for data shuffling.

Referring to FIG. 4, a flow chart (400) is provided illustrating the data shuffling preparation process. The first step (402), entails determining if the number of nodes in the arrangement is divisible by four. If the quantity of nodes is not divisible by four, the process concludes and the arrangement is not eligible for data shuffling. However, if the quantity of nodes in the arrangement is divisible by four, then an even number of rows and columns is determined, with the variable N associated with the rows of processing node and the variable M is associated with the columns of processing nodes (404). In a preferred embodiment, the quantity of rows is the same as and equal to the quantity of columns. Following step (404), the variable step is defined as the moment when the nodes in the arrangement are aligned between even and odd rows or columns and are communicating (406). There are two transfer times to be accounted for, including a row transfer time (408) and a column transfer time (410). The row transfer time (408) is defined as follows:

Row Transfer Time=1.2×DATA/$M$×SPEED and the column transfer time (410) is defined as follows:

Column Transfer Time=1.2×DATA/$N$×SPEED

, wherein DATA is the amount of data on a single node and SPEED is the amount of data transfer with respect to a set time interval, i.e. megabytes per second, M is the number of steps in the row transfer, and N is the number of steps in the column transfer. The final step in the data shuffling preparation process pertains to determining data for re-distribution. As shown, counting across each column and each row in the node arrangement, the data for re-distribution is determined (412). Accordingly, following step (412), the preparation process is concluded and shuffling of data among the processing nodes may be initiated.

Figure 5:
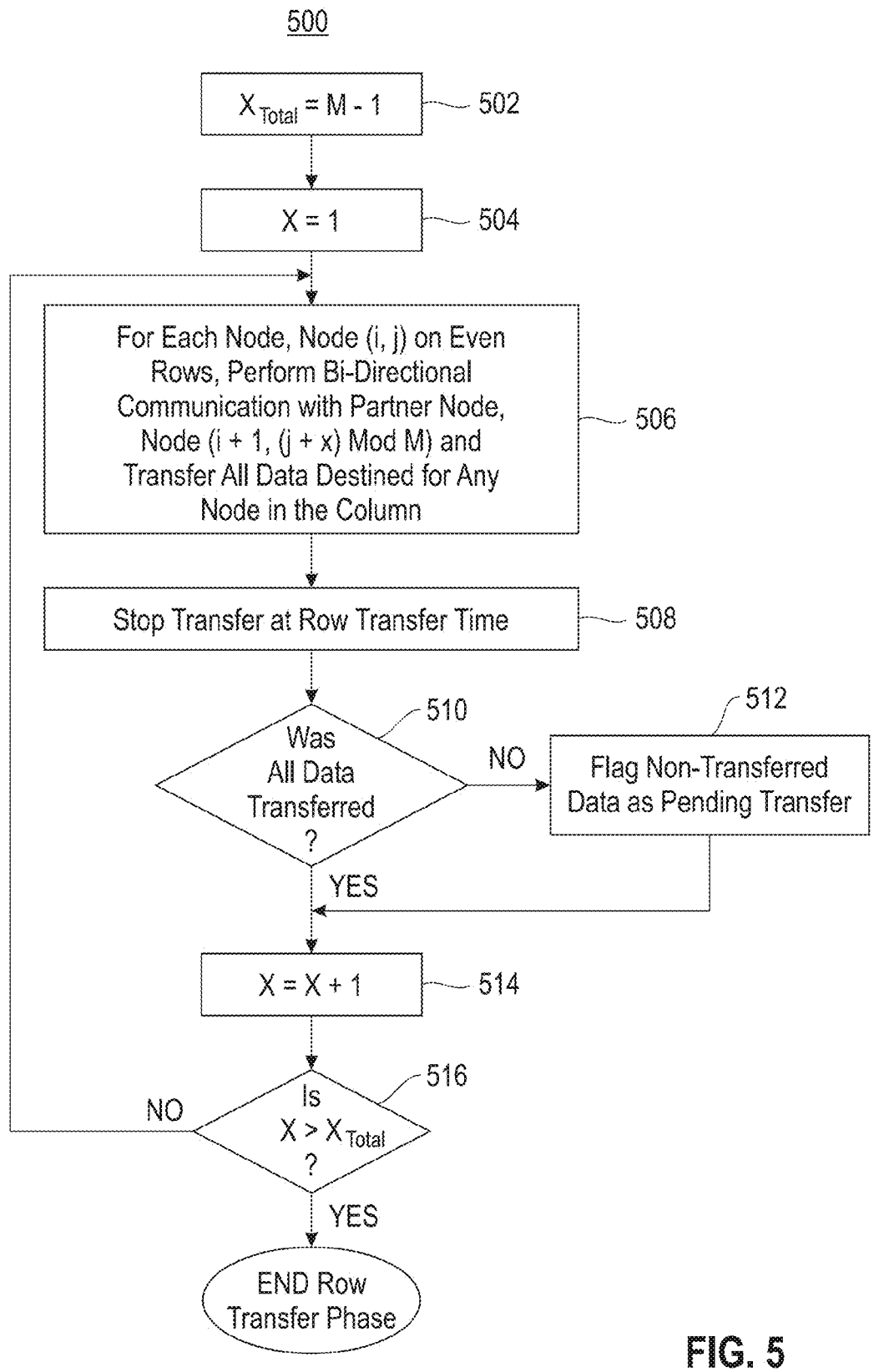
FIG. 5 depicts a flow chart illustrating a process for row transfer, including transferring data between node pairs.

Referring to FIG. 5, a flow chart (500) is provided illustrating a process for row transfer which includes transferring data between processing node pairs, referred to herein as node pairs. As shown, the counting variable $X_{Total}$ is set to the column counting variable less one (502), i.e. one less step, and an associated counting variable, X, is initialized (504), where X represents the step number for data transfer. Bi-directional communication takes place for each node, Node (i, j), on even rows, with partner Node ((i+1), C), and all data destined for any node is transferred to its alternate in the column pair, i.e. C XOR 1, (506), where C is defined as ((j+X) mod M). In the transfer of data at step (506), the variable i is counted starting at the first row, i.e. zero, and ending with two less than the row count, i.e. M−2, and the variable j is counted starting at the first column, i.e. zero, and ending with one less than the column count, i.e. N−1. In one embodiment, the alternate in the column pair is an adjacently column. As shown at step (506), data is transferred to an adjacent column node. The transfer of data shown at step (506) expires at the row transfer time (508). It is then determined if all of the data transferred to the aligned node with the time interval provided (510). Due to variations in node speed or amount of data per node, not all exchanges of data may finish at the same time. This is referred to as a skew. For any data that did not transfer, the non-transferred data is flagged as pending transfer (512). Following a positive response to the determination at step (510) or the data flagging at step (512), the step number counting variable for data transfer is incremented (514). It is then determined if all of the transfer steps have concluded (516). A negative response to the determination at step (516) returns to step (506) for node pairing and data transfer, and a positive response to the determination at step (516) ends the row transfer process. Accordingly, as shown herein, data is transferring between row pairs in preparation for the column transfer.

Figure 6:
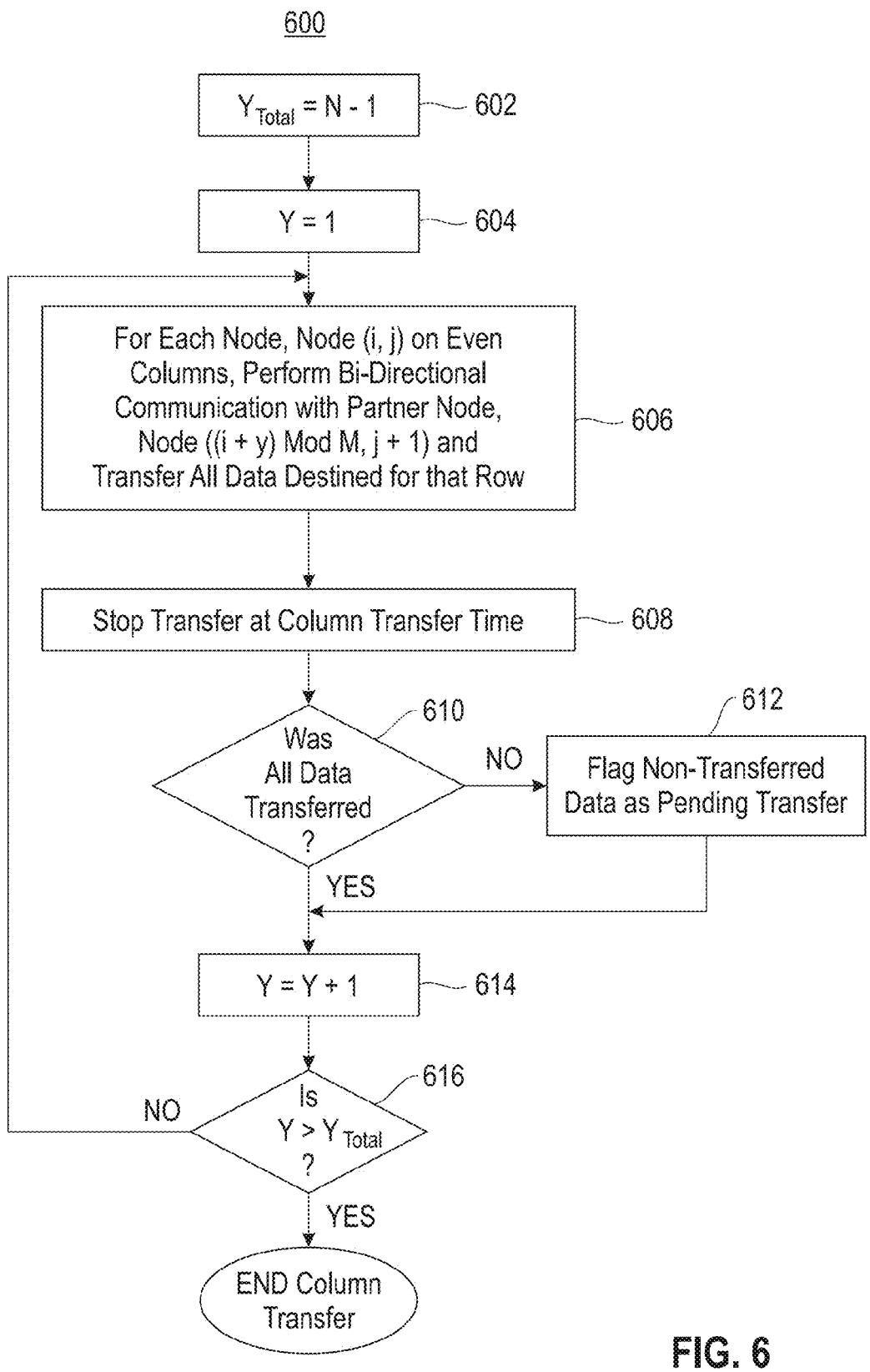
FIG. 6 depicts a flow chart illustrating a process for column transfer, including transferring data between node pairs.

Referring to FIG. 6, a flow chart (600) is provided illustrating a process for column transfer which includes transferring data between processing node pairs, referred to herein as node pairs. The variable $Y_{Total}$ is set to the quantity of rows N in the arrangement of processing nodes (602), and an associated counting variable is initialized (604). Bi-directional communication takes place for each node, Node (i, j), on even columns, with partner Node (C, j+1), and all data destined for that row is transferred in the column pair (606), where C is defined as ((i+Y) mod N). In the transfer of data at step (606), the variable i is counted starting at the first row, i.e. zero, and ending with one less than the row count, i.e. M−1, and the variable j is counted starting at the first column, i.e. zero, and ending with one less than the column count, i.e. N−1. After the data transfer at step (606) is complete, data is at the intended node with the exception of data that was not transferred due to time expiration. The transfer of data shown at step (606) expires at the column transfer time (608). It is then determined if all of the data transferred to the aligned node with the time interval provided (610). Due to variations in node speed or amount of data per node, not all exchanges of data may finish at the same time. This is referred to as a skew. For any data that did not transfer, the non-transferred data is flagged as pending transfer (612). Following a positive response to the determination at step (610) or the data flagging at step (612), the step number counting variable for data transfer is incremented (614). It is then determined if all of the transfer steps have concluded (616). A negative response to the determination at step (616) returns to step (606) for node pairing and data transfer, and a positive response to the determination at step (616) ends the column transfer process. Accordingly, as shown herein, data is transferred between column pairs to conclude the data shuffling.

The process described herein pertains to a logical arrangement of the nodes and to bi-directional data exchange occurring between each node pair in parallel. More specifically, data is exchanged in parallel with respect to the alignment. In one embodiment, one of the parameters of the transferred data is based on completion of one of the parallel data exchanges. For example, in one embodiment, data that was in the process of being shuffled but not transferred, e.g. omitted from the exchange, is placed into a buffer and sent directly to an associated targeted node or addressed in the clean-up process shown and described in FIG. 7.

The process described herein does not address node speed or the time to transmit data. Due to variation in node speed or the amount of data per node, not all exchanges are equal and not all exchanges may finish at the same time. These variations are referred to herein as skew. In data distribution associated with parallel processing, skew or node speed is a general issue. There is only a limited window within which data can be transmitted. If there is an imbalance in the amount of data to be transmitted between a pair of nodes, or variance in either data transfer speeds or in the time for which nodes are adjacent, not all of the data can be transmitted before the next node logical movement. In one embodiment, transmission times are fixed and are pre-computed based on predicted data transfer requirements. Similarly, in one embodiment, an additional time window also referred to herein as a threshold, is provided to address the effects of skew. In one embodiment, the threshold is twenty percent longer after the first node completes transmission. However, if, due to a severe skew, data remains that could not be exchanged, this remaining data is sent separately. In one embodiment, the separate transmission takes place in a second shuffle or via a different communication channel.

As shown and described herein, the data shuffling may take place based on a logical arrangement of node pairs. However, in one embodiment, the data shuffling may be based on a physical arrangement of node pairs. More specifically, the physical arrangement achieves a physical alignment through either physical movement of one or more of the processing nodes or physical movement of an interconnect between the nodes. Accordingly, the data shuffling is not limited to a logical processing node arrangement.

Figure 7:
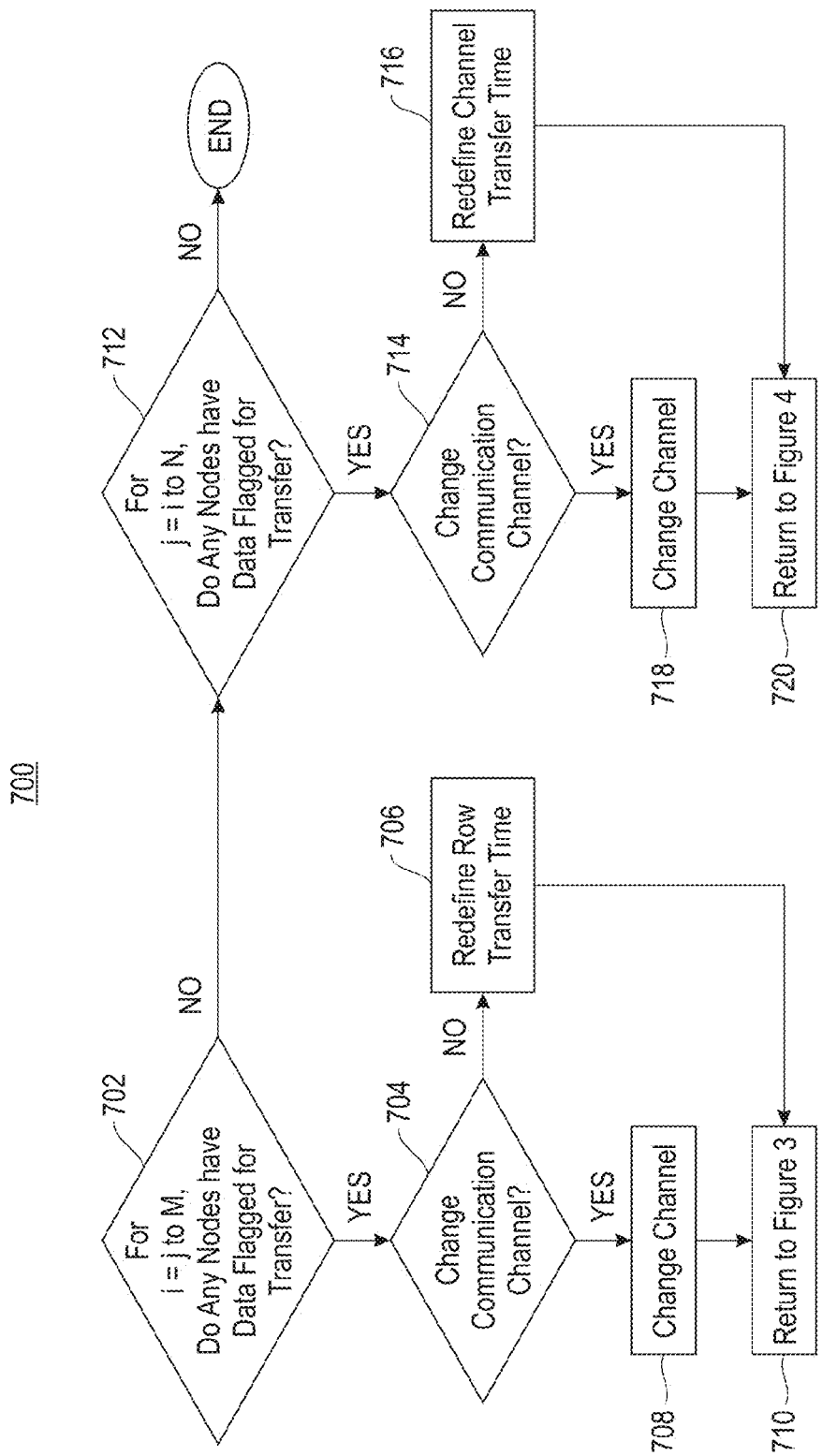
FIG. 7 depicts a flow chart illustrating a process for settling data that did not successfully transfer during the data shuffling process due to expiration of time.

As shown in FIGS. 5 and 6, data shuffling takes part in two sequential phases, including the row transfer and the column transfer. The data transfer is shown herein as two nodes. However, in one embodiment, the data transfer may include two or more partner nodes, wherein a partner node is an aligned node used for the purpose of communication. However, in each part of the transfer process, the time factor and data subject to transfer is limited to transferring during the set time factor. Data that does not transfer within this time factor is flagged and may be transferred at a later point in time. Referring to FIG. 7, a flow chart (700) is provided illustrating a process for settling data that did not successfully transfer during the data shuffling process due to expiration of the time factor. As shown, there are two determinations with respect to flagged data, including data flagged with respect to the row transfer phase and data flagged with respect to the column transfer phase. In the flow chart shown herein, the initial determination addresses data flagged during the row transfer phase, although in one embodiment, the order of the determinations may be reversed. For each of the rows in the matrix of processing nodes, it is determined if any of the nodes have data flagged for transfer (702). If there is data in any of the nodes that has been flagged, it is then determined if the communication channel should be changed so that the flagged data may be transferred using a different communication channel (704). If at step (704) it is determined that the communication channel is not going to be changed, then the row transfer time is redefined (706). Alternatively, if at step (706) it is determined that the communication channel is going to be changed, the channel is changed. Following the redefinition at step (706) or the channel change at step (708), the process returns to FIG. 3 to return to the row transfer phase for the flagged data that did not transfer during the prior iteration of the row transfer phase (710). Accordingly, prior to returning to the row transfer phase, at least one factor in the transfer process is changed to facilitate completion of data subject to transfer in this phase.

As shown in FIG. 6, data that did not successfully complete transfer during the column transfer phase is also flagged. As shown in FIG. 7, a negative response to the determination at step (702) is followed by another determination to ascertain for each of the columns in the matrix of processing nodes, if any of the nodes have data flagged for transfer (712). A negative response to the determination at step (712) is an indication that all of the data has been transferred among the nodes during both the row transfer phase and the column transfer phase. However, a positive response to the determination at step (712) is following by determining if the communication channel should be changed so that the flagged data may be transferred using a different communication channel (714). If at step (714) it is determined that the communication channel is not going to be changed, then the column transfer time is redefined (716). Alternatively, if at step (714) it is determined that the communication channel is going to be changed, the channel is changed (718). Following the redefinition at step (716) or the channel change at step (718), the process returns to FIG. 4 to the column transfer phase for the flagged data that did not transfer during the prior iteration of the column transfer phase (720). Accordingly, prior to returning to the column transfer phase, at least one factor in the transfer process is changed to facilitate completion of data subject to transfer in this phase.

Figures 8, 9:
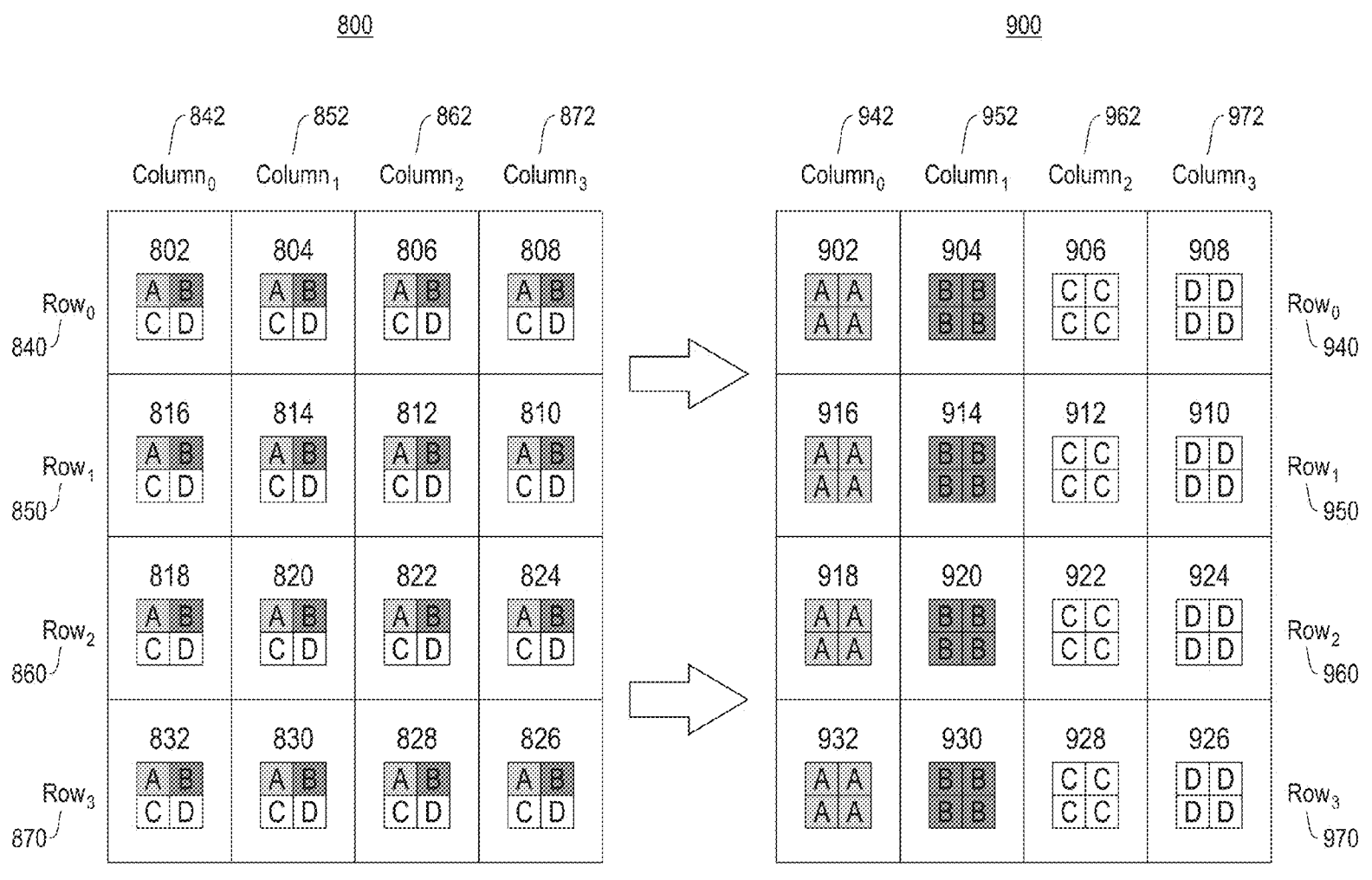

As described in FIGS. 3-7, data shuffling takes place in two primary phases, row transfer and column transfer. At the completion of the row transfer phase, the data is in the proper row and ready to be placed in the proper column through the column transfer phase. At the completion of the column transfer phase, the data is at the intended destination node with the exception of the data that did not transfer due to time expiration. Referring to FIG. 8, a block diagram (800) is provided illustrating placement of data in nodes following completion of the row transfer phase. As shown, there are sixteen nodes, (802)-(832) arranged in columns and rows. More specifically, the nodes are arranged in four rows (840), (850), (860), and (870) and four columns (842), (852), (862), and (872). Similarly, there are four data items residing on each node, each data item referred to herein as A, B, C, and D. Although the rows, columns, and data items are each shown having a quantity of four, this quantity is not limiting. In one embodiment, the arrangement and quantity of nodes may be different, and the quantity of residing data elements may be different, with the limitation that in a preferred embodiment the quantity of nodes is divisible by a factor of four.

Referring to FIG. 9, a block diagram (900) is provided illustrating placement of data in nodes following completion of the column transfer phase. As shown, there are sixteen nodes, (902)-(932) arranged in columns and rows. More specifically, the nodes are arranged in four rows (940), (950), (960), and (970) and four columns (942), (952), (962), and (972). Following completion of the column transfer phase, data is at the intended destination node. As shown each node in a single column has one classification of data. More specifically, $Col_0$ (942), which has nodes (902), (916), (918), and (932), contains data in class A, $Col_1$ (952), which has nodes (904), (914), (920), and (930), contains data in class B, $Col_2$ (962), which has nodes (906), (912), (922), and (928), contains data in class C, and $Col_3$ (972), which has nodes (908), (910), (924), and (926), contains data in class D. In the example shown herein, there is no residual data flagged for a clean-up operation due to failure to transfer within the allotted time. Accordingly, as shown in this example, following completion of the column transfer phase all of the data is at the intended destination.

The logical arrangement of processing nodes shown and described above is a two dimensional arrangement of processing nodes. However, the dimensions shown herein should not be limiting. In one embodiment, the processing nodes may be a three dimensional arrangement, with the processing nodes organized in rows, columns, and levels. In the three dimensional arrangement, the data shuffling process shown and described in FIG. 3-7 is extrapolated to include levels of shuffling. The first phase moves each piece of data to an appropriate row, the second phase moves each piece of data to an appropriate column, and the third phase moves each piece of data to an appropriate level. Accordingly, in the three dimensional logical arrangement, data is shuffled within each row of the logical structure, followed by each column, and then within each level of the structure.

As described and illustrated herein, data shuffling is administered by an application that manages a logical arrangement of the nodes, together with the parallel processing associated with the data exchanges, also referred to herein as data shuffling. Accordingly, the arrangement of the processing nodes together with the communication layer eliminates physical movement of the nodes while enabling and supporting data shuffling.

Figure 10:
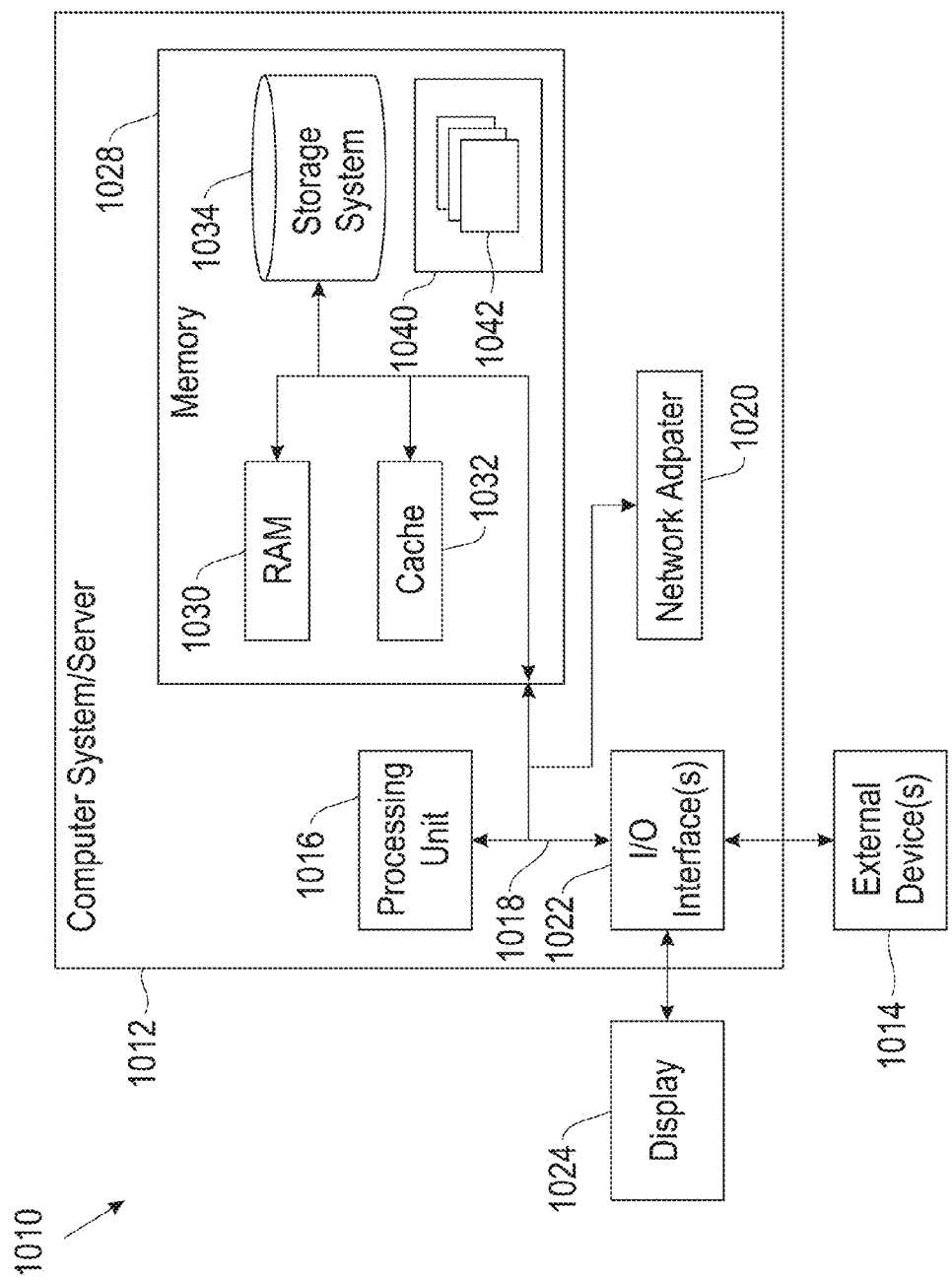
FIG. 10 depicts a schematic of an example of a cloud computing node.

A cloud computing environment is service oriented with a focus on statelessness, low coupling, modularity, and semantic interoperability. At the heart of cloud computing is an infrastructure comprising a network of interconnected nodes. In one embodiment, the logical data shuffling described in detail in FIGS. 1-9 may take place logically in a cloud computing environment. Referring now to FIG. 10, a schematic of an example of a cloud computing node is shown. Cloud computing node (1010) is only one example of a suitable cloud computing node and is not intended to suggest any limitation as to the scope of use or functionality of embodiments of the invention described herein. Regardless, cloud computing node (1010) is capable of being implemented and/or performing any of the functionality set forth hereinabove. In cloud computing node (1010) there is a computer system/server (1012), which is operational with numerous other general purpose or special purpose computing system environments or configurations. Examples of well-known computing systems, environments, and/or configurations that may be suitable for use with computer system/server (1012) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (1012) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (1012) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server (1012) in cloud computing node (1010) is shown in the form of a general-purpose computing device. The components of computer system/server (1012) may include, but are not limited to, one or more processors or processing units (1016), system memory (1028), and a bus (1018) that couples various system components including system memory (1028) to processor (1016). Bus (1018) represents one or more of any of several types of bus structures, including a memory bus or memory controller, a peripheral bus, an accelerated graphics port, and a processor or local bus using any of a variety of bus architectures. By way of example, and not limitation, such architectures include an Industry Standard Architecture (ISA) bus, a Micro Channel Architecture (MCA) bus, an Enhanced ISA (EISA) bus, Video Electronics Standards Association (VESA) local bus, and a Peripheral Component Interconnects (PCI) bus. A computer system/server (1012) typically includes a variety of computer system readable media. Such media may be any available media that is accessible by a computer system/server (1012), and it includes both volatile and non-volatile media, and removable and non-removable media.

System memory (1028) can include computer system readable media in the form of volatile memory, such as random access memory (RAM) (1030) and/or cache memory (1032). Computer system/server (1012) may further include other removable/non-removable, volatile/non-volatile computer system storage media. By way of example only, storage system (1034) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (1018) by one or more data media interfaces. As will be further depicted and described below, memory (1028) may include at least one program product having a set (e.g., at least one) of program modules that are configured to carry out the functions of embodiments of the invention.

Program/utility (1040), having a set (at least one) of program modules (1042), may be stored in memory (1028) by way of example, and not limitation, as well as an operating system, one or more application programs, other program modules, and program data. Each of the operating systems, one or more application programs, other program modules, and program data or some combination thereof, may include an implementation of a networking environment. Program modules (1042) generally carry out the functions and/or methodologies of embodiments of the invention as described herein.

Computer system/server (1012) may also communicate with one or more external devices (1014), such as a keyboard, a pointing device, or a display (1024), etc.; one or more devices that enable a user to interact with computer system/server (1012); and/or any devices (e.g., network card, modem, etc.) that enable computer system/server (1012) to communicate with one or more other computing devices. Such communication can occur via Input/Output (I/O) interfaces (1022). Still yet, computer system/server (1012) can communicate with one or more networks such as a local area network (LAN), a general wide area network (WAN), and/or a public network (e.g., the Internet) via network adapter (1020). As depicted, network adapter (1020) communicates with the other components of computer system/server (1012) via bus (1018). It should be understood that although not shown, other hardware and/or software components could be used in conjunction with computer system/server (1012). Examples, include, but are not limited to: microcode, device drivers, redundant processing units, external disk drive arrays, RAID systems, tape drives, and data archival storage systems, etc.

Figure 11:
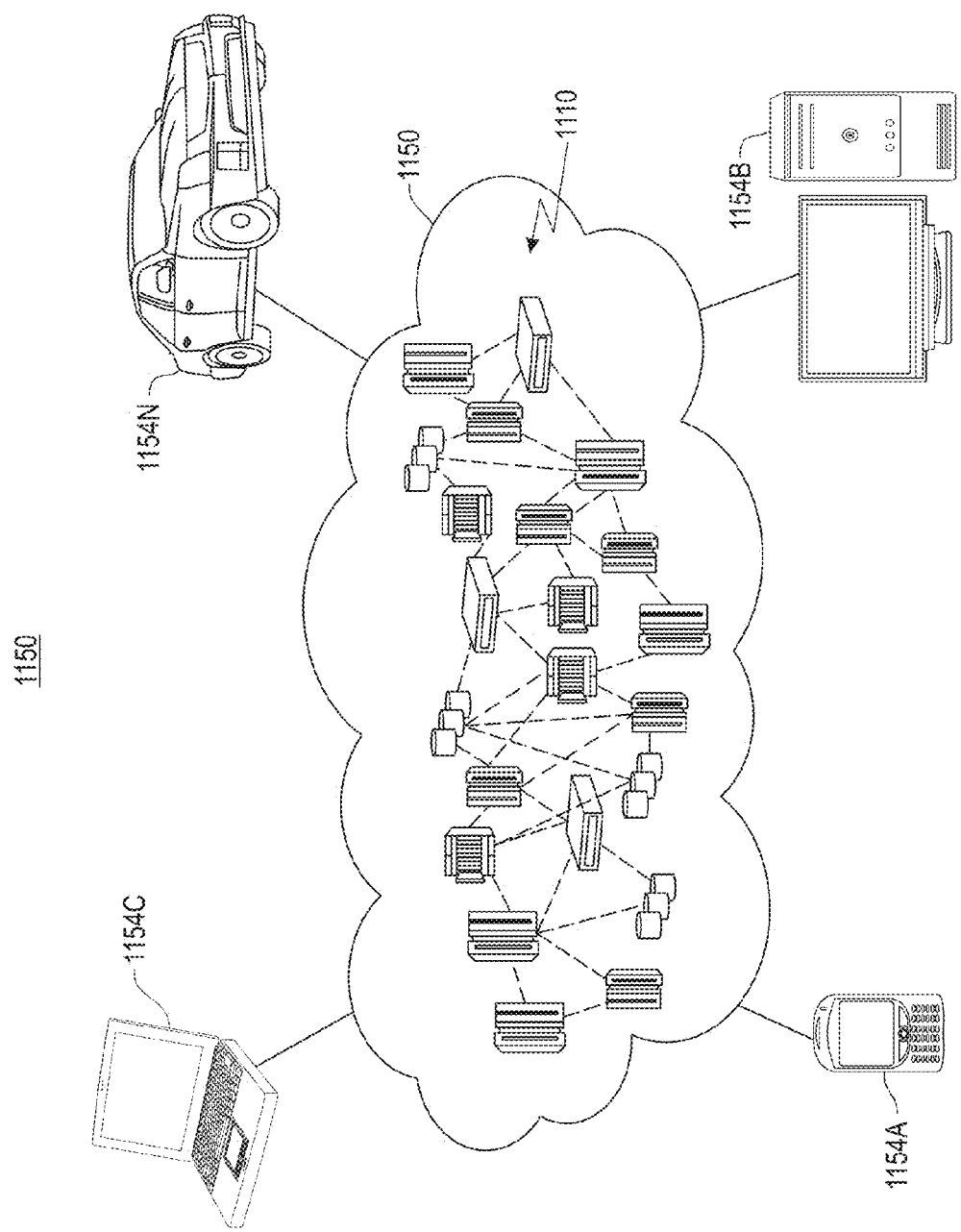
FIG. 11 depicts abstraction model layers according to an embodiment of the present invention.

Referring now to FIG. 11, illustrative cloud computing environment (1150) is depicted. As shown, cloud computing environment (1150) comprises one or more cloud computing nodes (1110) with which local computing devices used by cloud consumers, such as, for example, personal digital assistant (PDA) or cellular telephone (1154A), desktop computer (1154B), laptop computer (1154C), and/or automobile computer system (1154N) may communicate. Nodes (1110) may communicate with one another. They may be grouped (not shown) physically or virtually, in one or more networks, such as Private, Community, Public, or Hybrid clouds as described hereinabove, or a combination thereof. This allows cloud computing environment (1150) to offer infrastructure, platforms, and/or software as services for which a cloud consumer does not need to maintain resources on a local computing device. It is understood that the types of computing devices (1154A)-(1154N) shown in FIG. 11 are intended to be illustrative only and that computing nodes (1110) and cloud computing environment (1150) can communicate with any type of computerized device over any type of network and/or network addressable connection (e.g., using a web browser).

Figure 12:
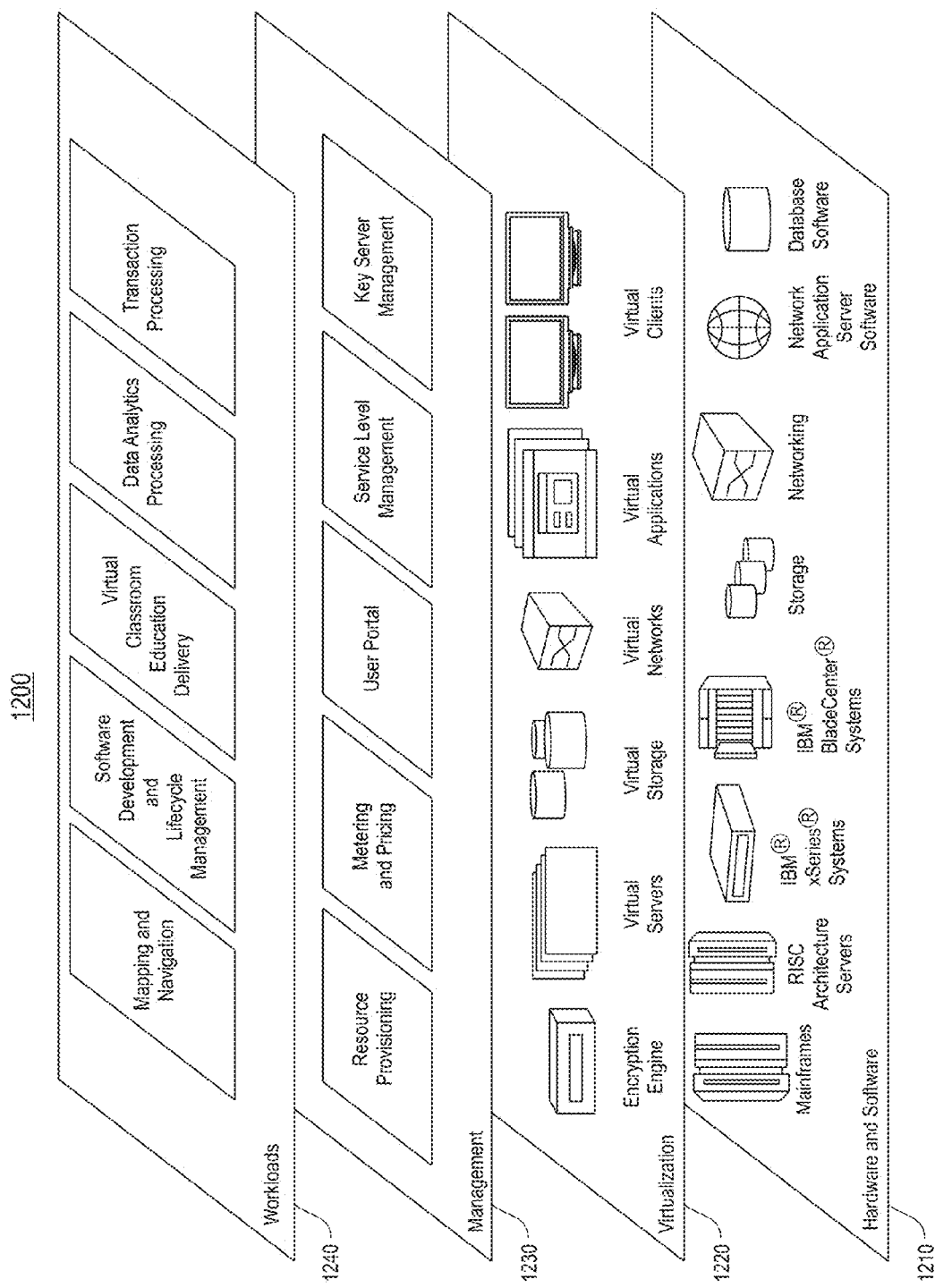
FIG. 12 depicts a set of functional abstraction layers provided by a cloud computing environment.

Referring now to FIG. 12, a set of functional abstraction layers provided by cloud computing environment (1200) is shown. It should be understood in advance that the components, layers, and functions shown in FIG. 12 are intended to be illustrative only and embodiments of the invention are not limited thereto. As depicted, the following layers and corresponding functions are provided: hardware and software layer (1210), virtualization layer (1220), management layer (1230), and workload layer (1240). The hardware and software layer (1210) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (1220) provides an abstraction layer from which the following examples of virtual entities may be provided: virtual servers; virtual storage; virtual networks, including virtual private networks; virtual applications and operating systems; virtual clients; and an encryption engine.

In one example, a management layer (1230) may provide the following functions: resource provisioning, metering and pricing, user portal, service level management, and key server management. The functions are described below. Resource provisioning provides dynamic procurement of computing resources and other resources that are utilized to perform tasks within the cloud computing environment. Metering and pricing provides cost tracking as resources that are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Key server management provides cloud computing key storage and lifecycle management such that required encryption and management of associated encrypted data are met.

Workloads layer (1240) provides examples of functionality for which the cloud computing environment may be utilized. In the shared pool of configurable computer resources described herein, hereinafter referred to as a cloud computing environment, files may be shared among users within multiple data centers, also referred to herein as data sites. Accordingly, a series of mechanisms are provided within the shared pool to support organization and management of data storage within the cloud computing environment.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the functions/acts specified in the flowcharts and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function (s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limiting to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the enhanced cloud computing model supports flexibility with respect to data shuffling, including, but not limited to, row, column, and/or level transfer of data within a network of processing nodes and/or a shared pool of resources.

Alternative Embodiment

It will be appreciated that, although specific embodiments of the invention have been described herein for purposes of illustration, various modifications may be made without departing from the spirit and scope of the invention. In one embodiment, one of the nodes in the data shuffling may fail to respond. Such failure may be based upon taking a node offline, a defect in the node, a problem with communication, etc. Regardless of the basis for the failure, in the event of the failure, one of the nodes redundantly routes data subject to the data shuffling via a different node in the same column and a different row as the failure node, and in the case of a three dimensional arrangement redundantly routing data via a different node on the same column and a different row and a different level as the failed node. In one embodiment, an optical communication channel is employed in the network of processing nodes, wherein switching of partners for data exchange is done by changing the routing within the optical switch connecting the nodes. The optical channel achieves a logical alignment of the processing nodes. Accordingly, the scope of protection of this invention is limited only by the following claims and their equivalents.

We claim:

1. A method comprising:
arranging a plurality of computing nodes in a cluster, the arrangement including a coordinated multi-dimensional communication topology, and a static distribution of data within the topology, with each node having two or more classes of data;
pre-determining a step sequence, a step encompassing an alignment of nodes into pairs within the topology, wherein the node pair includes at least one partner node;
logically rotating the nodes in the sequence;
exchanging data among the aligned node pairs in response to the rotation, wherein the data exchange supports bi-directional exchange between node pairs; and
re-distributing data among nodes in the topology in response to completion of the step-sequence, the re-distribution moving the data in phases, including a first phase and a second phase, wherein at completion of the re-distribution, nodes assigned to a first dimension consist of a first class of data and nodes assigned to a second dimension consist of a second class of data.

2. The method of claim 1, further comprising optically connecting the node pairs in support of the data exchange, wherein the optical connection achieves a logical alignment.

3. The method of claim 1, further comprising physically connecting the node pairs in support of the data exchange, wherein the physical connection achieves a physical alignment through a movement selected from the group consisting of: physical movement of one or more of the nodes, and physical movement of an interconnect between the nodes.

4. The method of claim 1, wherein the topology is a two dimensional structure, including the nodes arranged in rows and columns, and further comprising systematically exchanging data between pairs of nodes based on their alignment within the structure, wherein a quantity of re-distribution phases is two.

5. The method of claim 4, further comprising in response to failure of one of the nodes, redundantly routing data via a different node on the same column and a different row as the failed node.

6. The method of claim 1, wherein the topology is a three dimensional structure, including the nodes arranged in rows, columns, and levels, and further comprising systematically exchanging data between pairs of nodes based on their alignment within the structure, wherein a quantity of re-distribution phases is three.

7. The method of claim 6, further comprising in response to failure of one of the nodes, redundantly routing data via a different node on the same column and a different row and a different level as the failed node.

8. The method of claim 1, wherein the data exchange is parallel with respect to the alignment, and further comprising limiting data exchange based on completion of one of the parallel data exchanges, including placing data omitted from the exchange into a buffer and directly sending the buffered data to an associated target node.

9. A computer program product for data shuffling, the computer program product comprising a computer readable hardware storage device having program instructions embodied therewith, the program instructions executable by a processor to perform a method comprising:
   arranging, by the processor, a plurality of computing nodes in a coordinated communication topology and a static distribution of data within the topology, wherein each node has two or more classes of data;
   pre-determining a step sequence, a step encompassing an alignment of nodes into pairs within the topology, wherein the node pair includes at least one node partner;
   logically rotating the nodes in the sequence;
   exchanging data among the aligned node pairs in response to the rotation, wherein the data exchange supports bi-directional exchange between node pairs; and
   re-distributing data among nodes in the topology in response to completion of the step sequence, the re-distribution moving the data in phases, including a first phase and a second phase, wherein at completion of the re-distribution, nodes assigned to a first dimension consist of a first class of data and nodes assigned to a second dimension consist of a second class of data.

10. The program product of claim 9, further comprising optically connecting the node pairs in support of the data exchange, and program code to support a logical alignment.

11. The program product of claim 9, wherein the topology is a two dimensional structure, and further comprising program code for exchanging data between nodes based on their alignment within the structure, wherein the quantity of re-distribution phases is two.

12. The program code of claim 11, further comprising program code for detecting failure of one of the nodes, and for redundantly routing data via a different node on a same column and a different row as the failed node.

13. The program product of claim 9, wherein the topology is a three dimensional structure, and further comprising program code for exchanging data between nodes based on their alignment within the structure, wherein a quantity of re-distribution phases is three.

14. The program product of claim 13, further comprising program code for detecting failure of one of the nodes, and for redundantly routing data via a different node on a same column and a different row and a different level as the failed node.

15. A system comprising:
   a processing unit in communication with an application, the application to support data shuffling among a plurality of processing nodes;
   the application functionality comprising:
      a logical arrangement of the processing nodes in a coordinated multi-dimensional communication topology and a static distribution of data within the topology, with each node having at least two classes of data;
      a pre-determined step sequence, a step in the sequence encompassing an alignment of nodes into node pairs within the topology, wherein the node pair includes at least one partner node;
      a logical rotation of the nodes;
      an application to support data exchange among the aligned node pairs in response to the rotation, wherein the data exchange supports bi-directional exchange between node pairs; and
      the application to distribute data among nodes in the topology in response to completion of the step sequence, the re-distribution to move the data in phases, including a first phase and a second phase, wherein at completion of the re-distribution, nodes assigned to a first dimension consist of a first class of data and nodes assigned to a second dimension consist of a second class of data.

16. The system of claim 15, further comprising an optical connection of node pairs in support of the data exchange, wherein the optical connection achieves a logical alignment.

17. The system of claim 16, further comprising a physical connection of the node pairs in support of the data exchange, wherein the physical connection achieves a physical alignment through a movement selected from the group consisting of: physical movement of one or more nodes, and physical movement of an interconnect between the nodes.

18. The system of claim 15, further comprising in response to failure of one of the nodes, the application to redundantly route data via a different node on a same column and a different row as the failed node.

19. The system of claim 15, wherein the topology is a three dimensional structure, and further comprising the application to exchange data, wherein a quantity of re-distribution phases is three.

20. The system of claim 19, further comprising responsive to failure of one of the nodes, the application to redundantly route data via a different node on a same column and a different row and and a different level as the failed node.

* * * * *